April 5, 1932.  W. E. JOHNSON  1,852,656
ALTITUDE FINDER
Filed April 25, 1931
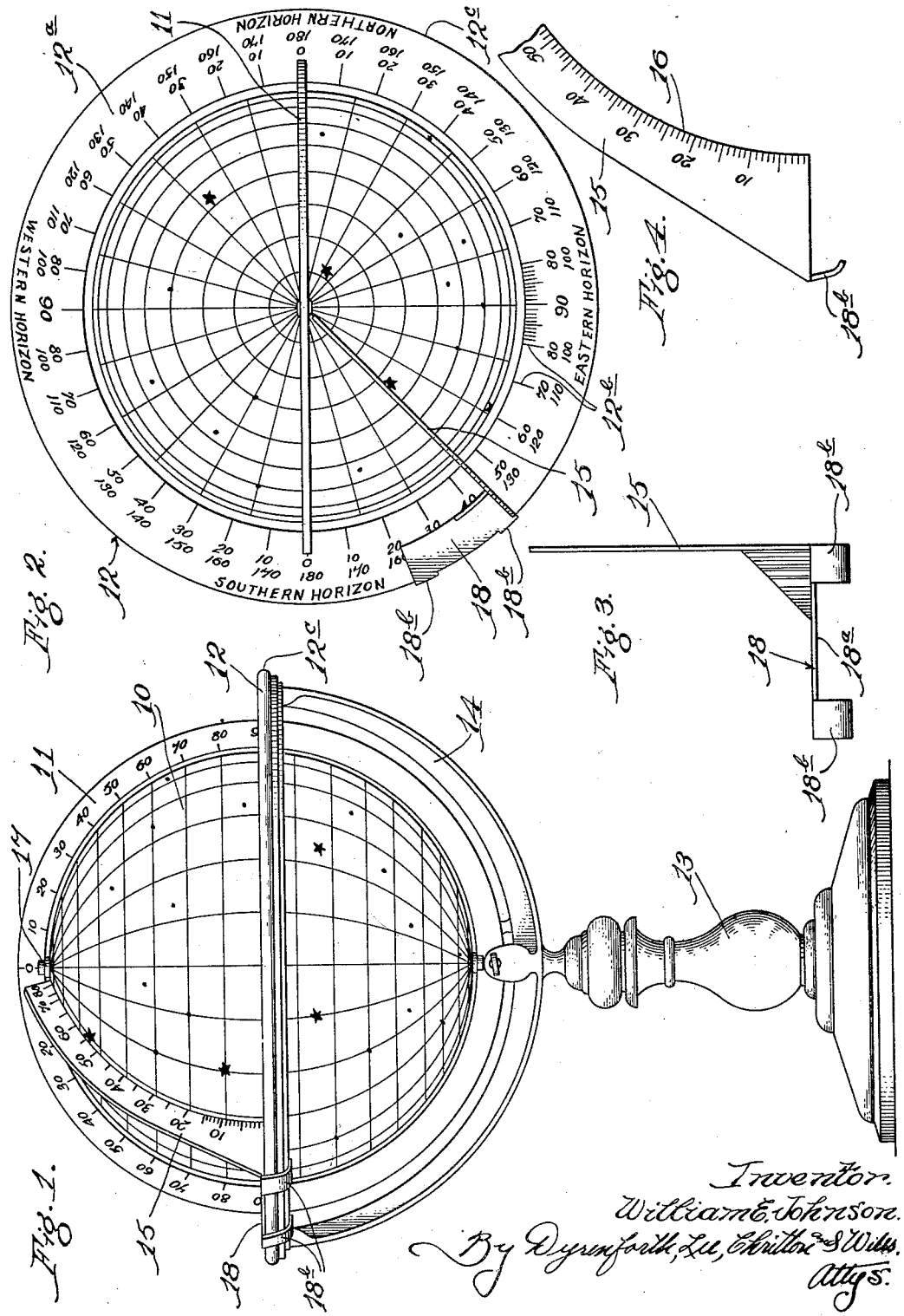

Patented Apr. 5, 1932

1,852,656

UNITED STATES PATENT OFFICE

WILLIAM E. JOHNSON, OF CHICAGO, ILLINOIS, ASSIGNOR TO RAND McNALLY & COMPANY, OF CHICAGO, ILLINOIS, A CORPORATION OF ILLINOIS

ALTITUDE FINDER

Application filed April 25, 1931. Serial No. 532,896.

This invention relates to improvements in altitude and azimuth finders and, more especially, such a device adapted for use with a sphere or globe in a mounting including an horizon ring.

Among the features of my invention is the provision of such a device enabling a user to find the altitude of a star or other body above the horizon on a celestial globe, or the latitude of a city or other place on a terrestrial globe (assuming the axis of the globe to be vertical). For the purpose of illustration, the globe here shown is a celestial globe.

My improved apparatus also enables a user to find the azimuth of a star or other body on a celestial globe or the longitude of a city or other place on a terrestrial globe (assuming the axis of the terrestrial globe to be vertical).

My improved device is so constructed that it can be used in conjunction with the horizon ring so that it can be placed in any position with respect to the globe and supported in a substantially vertical plane passing through the center of the sphere. When thus positioned, the altitude can be read on the scale and the position of the foot or base of the scale on the horizon ring will show the azimuth.

It is obvious that in order to show the correct altitude and azimuth, the scale must lie in a vertical plane passing through the center of the sphere; and my improved scale is provided with a base adapted to be fitted on the horizon ring so that the scale can be easily and correctly placed.

Other features and advantages of my invention will appear more fully as I proceed with my specification.

In that form of device embodying the features of my invention shown in the accompanying drawings—

Figure 1 is a view in side elevation; Fig. 2 is a top plan view; Fig. 3 is a fragmentary view of the scale in end elevation; and Fig. 4 is a similar view of the scale in side elevation.

As shown in the drawings, 10 indicates a celestial globe rotatably mounted in the meridian ring 11, which latter is rotatably supported in the horizon ring 12. Numeral 13 indicates an ordinary support with a semicircular member 14 carrying the horizon ring 12.

As here shown, the horizon ring 12 is provided with a flat horizontal upper surface $12^a$ graduated or scaled, as indicated by $12^b$.

My improved altitude and azimuth finder includes an arc-shaped or quadrant scale 15 suitably graduated in degrees, as indicated by 16, from the base to the upper end. It is understood that the curvature of the scale corresponds to the curvature of the globe with which it is to be used. As here shown, the scale is preferably not quite a complete quadrant. It may be, for example, only 85° long so that when the axis of the globe is vertical, there will be room for the axle mounting 17.

As shown in Fig. 3, the scale 15 is provided with a base 18 having a flat lower surface $18^a$ lying at right angles to the plane of the scale 15. When this base 18 is placed on the horizon ring with the surface $18^a$ flat on the upper surface $12^a$ of the horizon ring, it will ensure that the scale 15 lies in a vertical plane, that is, a plane at right angles to the upper horizontal surface of the horizon ring. In order to position the scale accurately, the same must lie not only in a vertical plane, but in a vertical plane passing through the center of the sphere. The base 18 of the scale is accordingly provided with two depending members $18^b$ adapted to be placed in contact with the outer circular edge $12^c$ of the horizon ring. The members $18^b$ are so arranged that when they are both in contact with such outer edge of the horizon ring, the scale 15 will lie in a vertical plane passing through a radius of the horizon ring and, consequently, passing through the center of the sphere. It is obvious that instead of providing two depending members $18^b$, $18^b$, a single elongated one suitably curved or arced to fit against the outer surface of the horizon ring could be used. In fact, the two pieces $18^b$, $18^b$ may be considered as a single curved elongated member with the middle portion removed.

In Figs. 1 and 2, the scale is shown in position and it will be seen that the altitude of a star can be read on the scale itself and the azimuth can be read on the scale on the upper surface of the horizon ring by noting the position of the foot of the vertical arc or scale 15.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A relatively narrow arc-shaped member having a scale of substantially 90° thereon, said member having a broad foot projecting substantially at right angles to its plane, said foot adapted to be fitted on the horizon ring of a sphere to prevent lateral tipping of said arc-shaped member.

2. A device as claimed in claim 1 in which the foot is adapted to be fitted on the horizon ring to hold the arc-shaped member in a substantially vertical plane passing through the center of said ring.

3. A device as claimed in claim 1 in which he foot is provided with a bottom flat surface adapted to be fitted on the top of an horizon ring having a flat upper surface.

4. A relatively narrow arc-shaped member having a scale of substantially 90° thereon, said member having a broad flat foot projecting substantially at right angles to its plane, said foot having a flat bottom surface adapted to rest on the top of an horizon ring having a flat upper surface and said foot being provided with a part or parts adapted to engage the outer edge of a curved horizon ring to hold the scale in a vertical plane passing through the center of such a ring.

In witness whereof, I have hereunto set my hand and seal, this 21 day of April, 1931.

WILLIAM E. JOHNSON.